US012695729B2

(12) United States Patent
Nguyen et al.

(10) Patent No.: US 12,695,729 B2
(45) Date of Patent: Jul. 28, 2026

(54) METHOD AND SYSTEM FOR PRESERVING PRIVACY OF TELEMATIC DATA

(71) Applicant: HCL Technologies Limited, Nehru Place (IN)

(72) Inventors: Duc Cuong Nguyen, Hanoi (VN); Hiep Nguyen, Hanoi (VN); Simy Chacko, Chennai (IN)

(73) Assignee: HCL Technologies Limited, Nehru Place (IN)

( * ) Notice: Subject to any disclaimer, the term of this patent is extended or adjusted under 35 U.S.C. 154(b) by 63 days.

(21) Appl. No.: 18/945,631

(22) Filed: Nov. 13, 2024

(65) Prior Publication Data

US 2025/0260673 A1 Aug. 14, 2025

(30) Foreign Application Priority Data

Feb. 13, 2024 (IN) .............................. 202411009783

(51) Int. Cl.
  *H04L 9/00* (2022.01)
  *G06Q 40/08* (2012.01)
    (Continued)

(52) U.S. Cl.
  CPC ......... *H04L 63/0421* (2013.01); *G06Q 40/08* (2013.01); *G07C 5/02* (2013.01); *H04L 9/008* (2013.01); *H04L 63/0478* (2013.01)

(58) Field of Classification Search
  CPC . H04L 63/0421; H04L 9/008; H04L 63/0478; G06Q 40/08; G07C 5/02
    (Continued)

(56) References Cited

U.S. PATENT DOCUMENTS

| | | | | |
|---|---|---|---|---|
| 10,475,127 | B1 * | 11/2019 | Potter | .................... G08B 21/02 |
| 10,540,723 | B1 * | 1/2020 | Potter | .................... G08B 25/00 |

(Continued)

FOREIGN PATENT DOCUMENTS

DE 102018006747 A1 * 8/2019 ............. H04L 9/008

OTHER PUBLICATIONS

Huayi Qi; Zhiguo Wan; Zhangshuang Guan; Xiuzhen Cheng; Scalable Decentralized Privacy-Preserving Usage-Based Insurance for Vehicles; Mar. 15, 2021; vol. 8, Issue: 6; IEEE Internet of Things Journal.

(Continued)

*Primary Examiner* — Thanh T Le
(74) *Attorney, Agent, or Firm* — Kendal M. Sheets

(57) ABSTRACT

This disclosure relates to system and method for preserving privacy of telematic data. The method includes receiving telematic data from a vehicle and a set of predefined policies from an insurance provider. The telematic data and the set of predefined policies are homomorphically encrypted through a multi-key homomorphic encryption technique. The method further includes analyzing the telematic data and the set of predefined policies to obtain an analysis result. The method further includes sharing the analysis result with the vehicle in an encrypted format. The method further includes partially decrypting the analysis result to obtain a partially decrypted result. The method further includes sharing the partially decrypted result to the insurance provider. The method further includes decrypting the partially decrypted result to obtain fully decrypted result in a plain-text format. The fully decrypted result provides risk score information to the insurance provider without revealing sensitive information corresponding to the vehicle.

20 Claims, 10 Drawing Sheets

(51) Int. Cl.
    *G07C 5/02*        (2006.01)
    *H04L 9/40*        (2022.01)

(58) Field of Classification Search
    USPC ......................................................... 713/171
    See application file for complete search history.

(56)              References Cited

U.S. PATENT DOCUMENTS

| | | | |
|---|---|---|---|
| 11,138,321 B2 * | 10/2021 | Gryb .................. | H04W 12/033 |
| 11,631,117 B2 * | 4/2023 | Schroepfer ........... | H04L 9/0822 |
| | | | 705/26.2 |
| 11,657,458 B2 * | 5/2023 | Hayes .................. | G06Q 50/265 |
| | | | 705/51 |
| 2015/0025917 A1 | 1/2015 | Stempora | |
| 2021/0081565 A1 * | 3/2021 | Sakamoto ........... | G06F 21/6245 |
| 2022/0353087 A1 * | 11/2022 | Asharov ................. | G06Q 40/04 |
| 2023/0006819 A1 * | 1/2023 | Spector ................. | H04L 9/0825 |
| 2023/0269068 A1 * | 8/2023 | Hiromasa ............... | H04L 9/085 |
| | | | 713/171 |
| 2025/0028856 A1 * | 1/2025 | Huntley ................ | G06F 21/602 |
| 2025/0119298 A1 * | 4/2025 | Deshpande ........... | H04L 9/3093 |
| 2025/0158800 A1 * | 5/2025 | Tueno ....................... | H04L 9/14 |

OTHER PUBLICATIONS

Hao Chen, Wei Dai, Miran Kim, and Yongsoo Song; , Efficient Multi-Key Homomorphic Encryption with Packed Ciphertexts with Application to Oblivious Neural Network Inference; Microsoft Research, Redmond, USA UTHealth, Houston, USA.

* cited by examiner

Figures 4, 5:
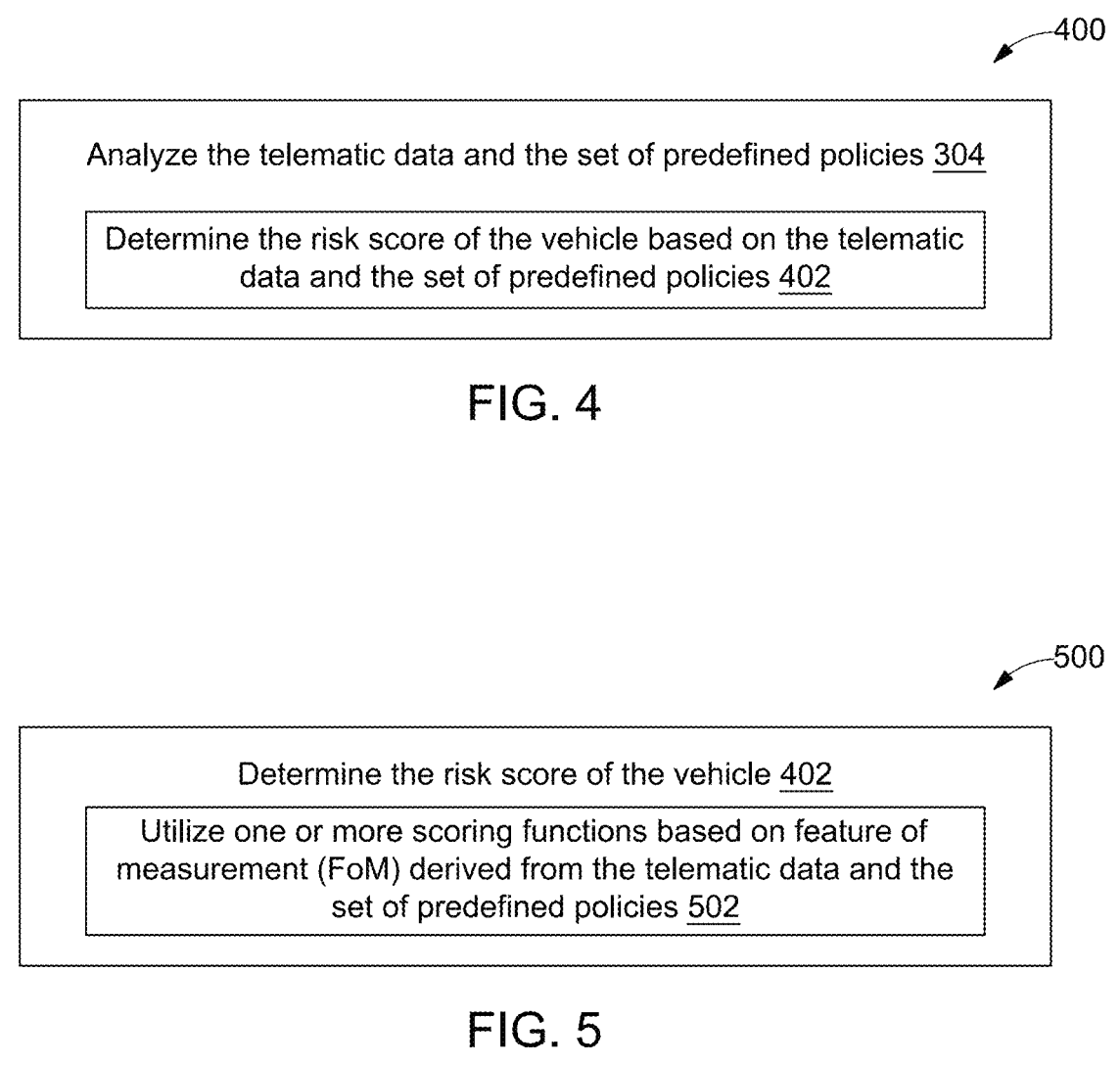

400

Analyze the telematic data and the set of predefined policies 304

Determine the risk score of the vehicle based on the telematic data and the set of predefined policies 402

Determine the risk score of the vehicle 402

Utilize one or more scoring functions based on feature of measurement (FoM) derived from the telematic data and the set of predefined policies 502

METHOD AND SYSTEM FOR PRESERVING PRIVACY OF TELEMATIC DATA

TECHNICAL FIELD

This disclosure relates generally to privacy protection, and more particularly to a system and method for preserving privacy of vehicle's telematic data using multi-key homomorphic encryption techniques.

BACKGROUND

In recent years, the utilization of telematic data in insurance industry has gained significant traction. Telematic data, which includes measurements of various vehicle attributes such as speed, acceleration, steering, and location, presents an invaluable opportunity for insurance providers to assess and tailor insurance policies to individual driver behaviors. This approach, commonly referred to as usage-based insurance (UBI), promises a more accurate risk assessment and fairer premium calculations based on actual driving performance.

However, the collection, analysis, and storage of telematic data may cause significant privacy concerns for vehicle owners and drivers. Current UBI systems typically involve the transmission of detailed and sensitive driving behavior data to insurance providers and third-party analytical services. This data transfer exposes vehicle owners to potential breaches of privacy, as their driving habits and precise vehicle locations may become accessible to unauthorized entities.

Therefore, in order to provide solutions to the aforementioned drawback, there exists a need to develop a secure and privacy-preserving solution for telematic data analysis in usage-based insurance. Such a solution may not only address the privacy concerns of vehicle owners but also provide insurance providers with accurate and reliable risk assessment tools while ensuring the confidentiality of sensitive data.

SUMMARY

In one embodiment, a method for preserving privacy of telematic data is disclosed. In one example, the method may include receiving, by a computing device, telematic data from a vehicle and a set of predefined policies from an insurance provider. It should be noted that the telematic data and the set of predefined policies may be homomorphically encrypted through a multi-key homomorphic encryption technique. The method may further include analyzing, by the computing device, the telematic data and the set of predefined policies that are homomorphically encrypted to obtain an analysis result. The analysis result may represent a risk score associated with a driving behavior of the vehicle. The method may further include sharing, by the computing device, the analysis result with the vehicle in an encrypted format. The method may further include partially decrypting, by vehicle and through a first decryption key, the analysis result to obtain a partially decrypted result. The analysis result may be partially decrypted without revealing the risk score to a user of the vehicle. The method may further include sharing, by the vehicle, the partially decrypted result to the insurance provider. The method may further include decrypting, by the insurance provider and through a second decryption key, the partially decrypted result to obtain a fully decrypted result in a plain-text format. It should be noted that the fully decrypted result may provide risk score information to the insurance provider without revealing sensitive information corresponding to the vehicle.

In another embodiment, a system for preserving privacy of telematic data is disclosed. In one example, the system may include a processor and a memory communicatively coupled to the processor. The memory store processor-executable instructions, which, on execution, may cause the processor to receive telematic data from a vehicle and a set of predefined policies from an insurance provider. It should be noted that the telematic data and the set of predefined policies may be homomorphically encrypted through a multi-key homomorphic encryption technique. The processor-executable instructions, on execution, may further cause the processor to analyze the telematic data and the set of predefined policies that are homomorphically encrypted to obtain an analysis result. The analysis result may represent a risk score associated with a driving behavior of the vehicle. The processor-executable instructions, on execution, may further cause the processor to share the analysis result with the vehicle in an encrypted format. The processor-executable instructions, on execution, may further cause the processor to partially decrypt the analysis result to obtain a partially decrypted result. The analysis result may be partially decrypted without revealing the risk score to a user of the vehicle. The processor-executable instructions, on execution, may further cause the processor to share the partially decrypted result to the insurance provider. The processor-executable instructions, on execution, may further cause the processor to decrypt the partially decrypted result to obtain a fully decrypted result in a plain-text format. It should be noted that the fully decrypted result may provide risk score information to the insurance provider without revealing sensitive information corresponding to the vehicle.

In yet another embodiment, a non-transitory computer-readable medium storing computer-executable instruction for preserving privacy of telematic data is disclosed. The stored instructions, when executed by a processor, may cause the processor to perform operations including receiving telematic data from a vehicle and a set of predefined policies from an insurance provider. It should be noted that the telematic data and the set of predefined policies may be homomorphically encrypted through a multi-key homomorphic encryption technique. The operations may further include analyzing the telematic data and the set of predefined policies that are homomorphically encrypted to obtain an analysis result. The analysis result may represent a risk score associated with a driving behavior of the vehicle. The operations may further include sharing the analysis result with the vehicle in an encrypted format. The operations may further include partially decrypting the analysis result to obtain a partially decrypted result. The analysis result may be partially decrypted without revealing the risk score to a user of the vehicle. The operations may further include sharing the partially decrypted result to the insurance provider. The operations may further include decrypting the partially decrypted result to obtain a fully decrypted result in a plain-text format. It should be noted that the fully decrypted result may provide risk score information to the insurance provider without revealing sensitive information corresponding to the vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a flow diagram of a method for analyzing telematic data and a set of predefined policies, in accordance with some embodiments of the present disclosure.

FIG. 5 is a flow diagram of a method for determining a risk score of a vehicle, in accordance with some embodiments of the present disclosure.

DETAILED DESCRIPTION

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to be one of ordinary skill in the art. Additionally, memory or other storage, as well as communication components, may be employed in embodiments of the invention.

Figure 1:
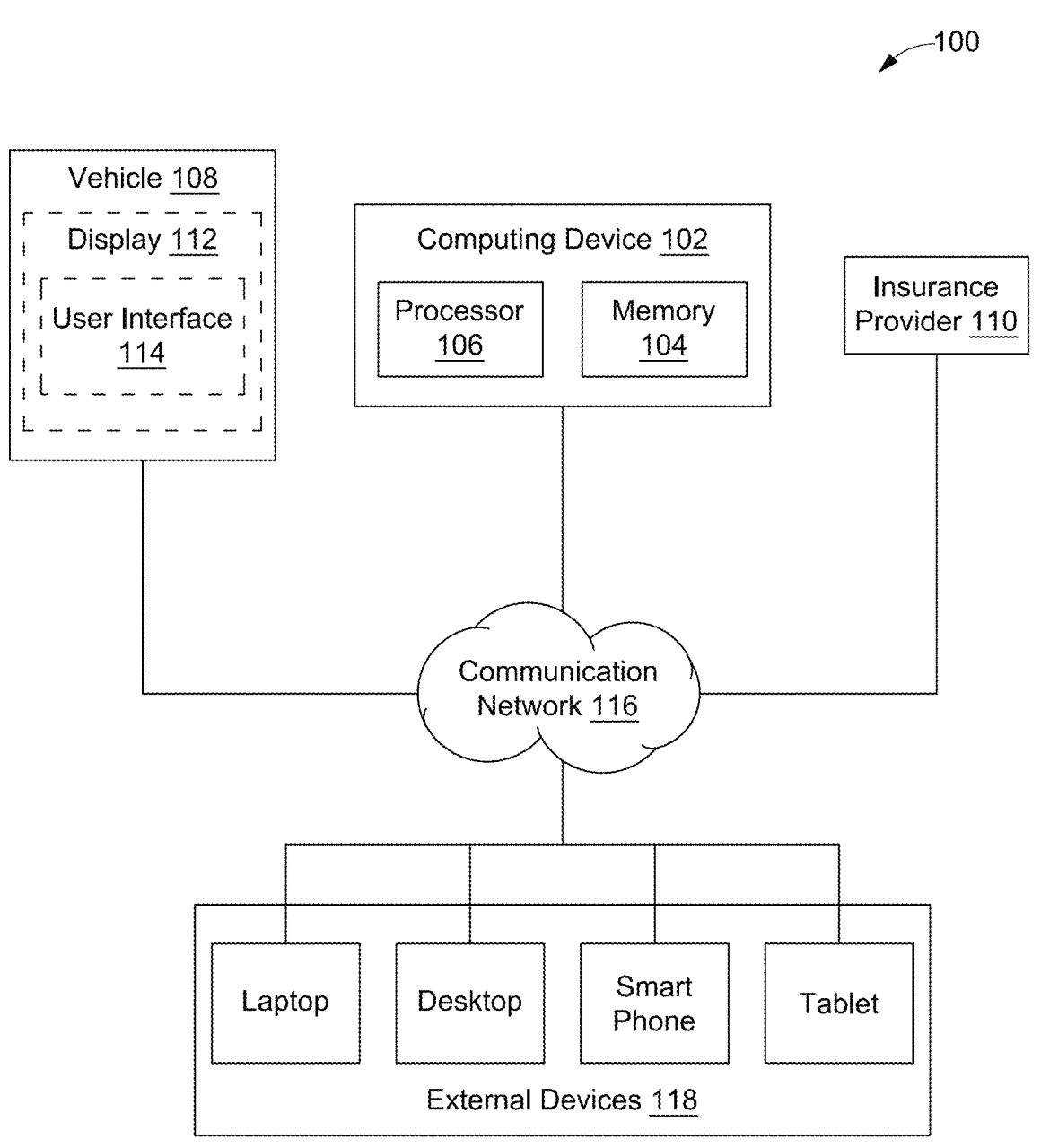
FIG. 1 illustrates an environment of a system for preserving privacy of telematic data, in accordance with some embodiments of the present disclosure.

Referring now to FIG. 1, an environment of a system 100 for preserving privacy of telematic data is illustrated, in accordance with some embodiment of the present disclosure. More specifically, the system 100 may be designed to protect the privacy of vehicle's telematic data for usage-based insurance, aiming to calculate a unique risk score (e.g., insurance risk score) for each vehicle. This risk score may then be utilized by insurance providers to offer personalized insurance policies to vehicle owners.

There are well-established rules and recommendations for safe driving, encompassing factors such as maintaining speed limits, driving smoothly without sudden manoeuvres, adhering to daily driving time limits, and taking breaks during long-distance trips. These criteria and thresholds, often derived from transportation laws, extensive research, and from insurance providers, serve as crucial benchmarks for assessing driving safety. Violations of these criteria raise concerns regarding the potential for traffic accidents. However, while assessing driving safety based on these criteria is a natural approach, it brings forth significant privacy challenges. Concerns like stalking and data leaks emerge when sensitive driving behaviour data is collected and analyzed.

Thus, the proposed system 100 may resolve aforementioned challenges associated with privacy concerns by utilizing multi-key homomorphic encryption techniques during the computation of a vehicle's telematic data and a set of policies. The homomorphic encryption is a method that permits computation on encrypted data without the need to decrypt it. In particular, only a party possessing the respective encryption key may decrypt and access the data. In practice, both sides, namely the vehicle and the insurance provider, encrypt their data independently using their unique encryption keys. This approach ensures that the system 100 may be applied in various scenarios, including usage-based insurance. In this context, insurance companies may employ the system 100 to customize their insurance policies for individual vehicles, without knowing the vehicle's sensitive data, such as location, movement, or sensor data.

Furthermore, the proposed system 100 may be employed on patient health monitoring where monitoring devices may be used to track a patient's health status. These monitoring devices may only provide homomorphically encrypted health data to a central unit. The central unit may only receive alerts when a risk score exceeds a predefined threshold, without any specific health-related data being disclosed to any party, particularly the computing device 102.

The system 100 may include a computing device 102 that may be capable of preserving privacy of vehicle's telematic data for usage based insurance. The computing device 102 may further include a memory 104, and a processor 106. As depicted via the present FIG. 1, the computing device 102 may further be connected to a vehicle 108, and an insurance provider 110 via a communication network 116. Examples of the computing device 102 may include, but are not limited to, a cloud server, a desktop, a laptop, a notebook, a tablet, a smartphone, a mobile phone, an application server, or the like. The memory 104 may store instructions that, when executed by the processor 106, cause the processor 106 to initiate a process of privacy preservation.

As will be described in greater detail in conjunction with FIG. 2 to FIG. 12, in order to initiate the privacy preservation process, initially the computing device 102 may receive telematic data from the vehicle 108 and a set of predefined policies from an insurance provider 110. The telematic data and the set of predefined policies may be homomorphically encrypted through the multi-key homomorphic encryption technique before sharing it to the computing device 102. Further, the computing device 102 may analyze the telematic data and the set of predefined policies that are homomorphically encrypted to obtain an analysis result. Thereafter, the computing device 102 may share the analysis result with the vehicle 108 in an encrypted format. Further, the vehicle 108 may partially decrypt the analysis result through a first decryption key to obtain a partially decrypted result. The vehicle 108 may further share the partially decrypted result to the insurance provider 110. Finally, the insurance provider 110 may decrypt the partially decrypted result through a second decryption key to obtain a fully decrypted result in a plain-text format.

The memory 104 may also store various data (e.g., homomorphically encrypted telematic data of the vehicle 108, set of predefined policies, analysis result in an encrypted form, etc.) that may be captured, processed, and/or required by the computing device 102. The memory 104 may be a non-volatile memory (e.g., flash memory, Read Only Memory (ROM), Programmable ROM (PROM), Erasable PROM (EPROM), Electrically EPROM (EE-PROM) memory, etc.) or a volatile memory (e.g., Dynamic Random Access Memory (DRAM), Static Random-Access memory (SRAM), etc.).

In some embodiments, the computing device 102 may interact with a user of the vehicle 108 via a Global Positioning System (GPS) for sending and receiving data. In particular, the computing device 102 may interact with the user of the vehicle 108 via a user interface 114 accessible via a display 112. Thus, for example, in some embodiments, the vehicle 108 may render the user interface 114 to enable the user to homomorphically share the telematic data of the vehicle 108 to the computing device 102 via the GPS.

In some embodiments, the computing device 102 may interact with one or more external devices 118 over the communication network 116 to render personalized insurwork 116 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

As will be appreciated by one skilled in the art, a variety of processes may be employed for preserving privacy of telematic data. For example, the system 100 and the associated computing device 102 may preserve privacy of telematic data by the processes discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Figure 2:
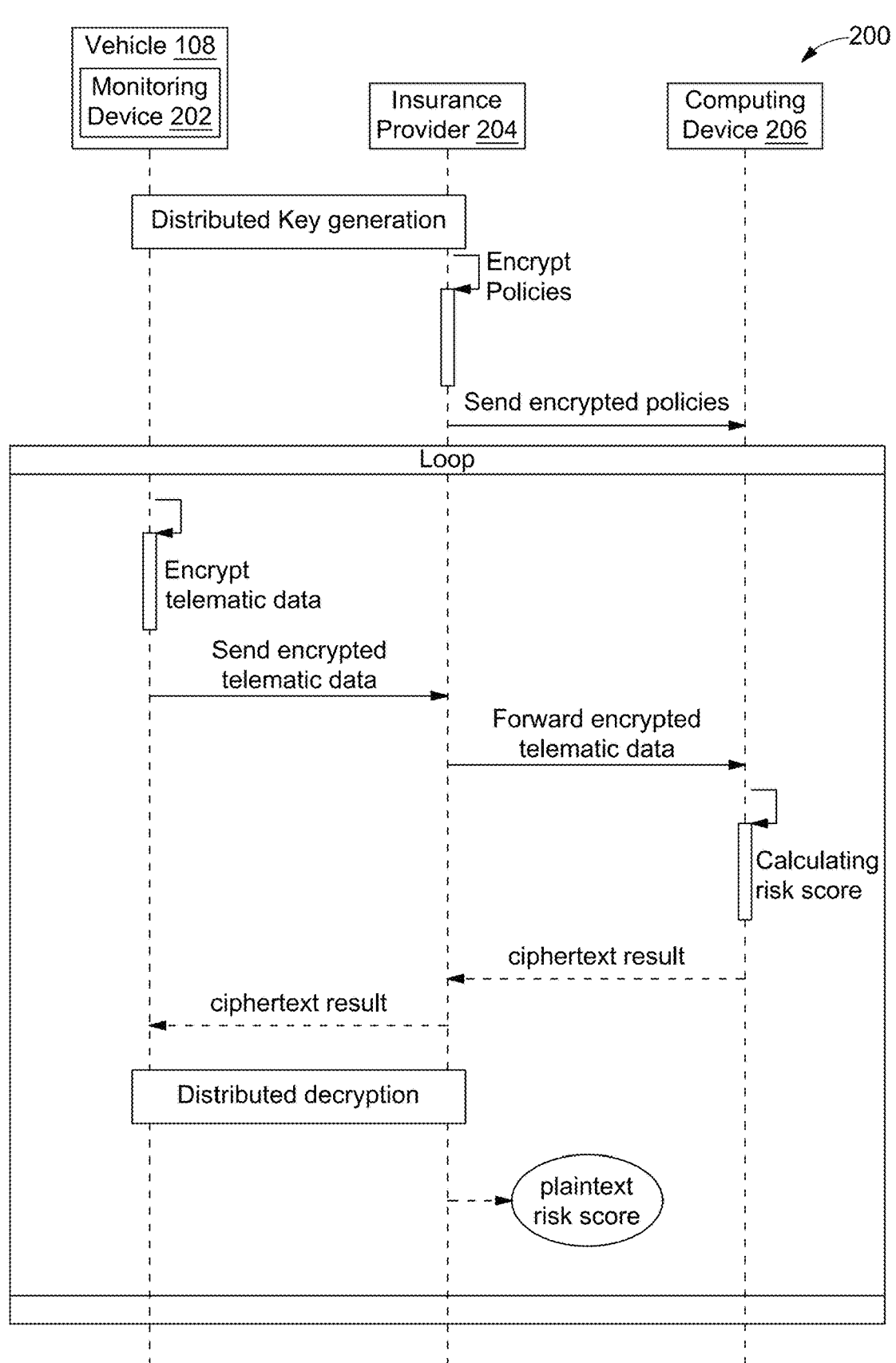
FIG. 2 illustrates a detailed process flow for preserving privacy of telematic data, in accordance with some embodiments of the present disclosure.

Referring now to FIG. 2, a detailed process flow 200 for preserving privacy of telematic data is illustrated, in accordance with some embodiments of the present disclosure. The process flows among three parties. A first party may be a monitoring device 202 installed within the vehicle 108. A second party may be an insurance provider 204 (analogous to the insurance provider 110). A third party may be a computing device 206 (analogous to the computing device 102).

The monitoring device 202 may be configured to monitor telematic data related to the vehicle 108 and further share the telematic data periodically to the insurance provider 204. It should be noted that the telematic data may be encrypted using multi-key homomorphic encryption technique before sharing with the insurance provider 204. The telematic data may include, but not be limited to, a speed information of the vehicle, a steering angle information of the vehicle, a current time, a speed limit of the vehicle, and a current location of the vehicle.

A list of telematic data received from the monitoring device 202 is illustrated in Table 1. The Table 1 includes telematic data names, notation of the corresponding telematic data, transmitted content, description of the corresponding telematic data, telematic data format, and sender name.

| Data | Notation | Transmitted content | Description | Data format | Sender |
|------|----------|---------------------|-------------|-------------|--------|
| Speed | $s_k$ | $s_k$ | Vehicle speed at time instant k | ciphertext | Vehicle |
| Steer angle | $\omega_k$ | $\omega_k$ | Steering angle | ciphertext | Vehicle |
| Time instant | $t_k$ | $t_k$ | Current time | plaintext | Vehicle |
| Speed limits | $\hat{s}_1, \hat{s}_2$ | $\hat{s}_1, \hat{s}_2, \dfrac{1}{(\hat{s}_2 - \hat{s}_1)}$ | Speed limits (min, max) associated to the vehicle's position at time instant k | ciphertext | Vehicle | ance policies to the user or owner of the vehicle 108. The one or more external devices 120 may include, but may not be limited to, a desktop, a laptop, a notebook, a netbook, a tablet, a smartphone, a remote server, a mobile phone, or another computing system/device. The communication net- The insurance provider 204 may forward the telematic data along with a set of predefined policies (e.g., a list of thresholds) to the computing device 102 for analyzing the telematic data that the monitoring device 202 has previously shared. The set of predefined policies may be encrypted using the multi-key homomorphic encryption technique before sharing with the computing device 102. The set of predefined policies may include, but may not be limited to, an acceleration limit of the vehicle, an angular acceleration limit of the vehicle, a driving time limit of the vehicle, a distance limit of the vehicle, combination coefficients, and exponent values. In some embodiments, the set of policies may be updated regularly or even in real-time depending on the context (e.g., speed limits on highway is different from speed limits on inner-city).

By way of an example, Table 2 shows a set of predefined policies that may include following information:

| Data | Notation | Transmitted content | Description | Data format |
|------|----------|---------------------|-------------|-------------|
| Acceleration limit | $\hat{a}_1, \hat{a}_2$ | $\hat{a}_1, \hat{a}_2, \dfrac{1}{(\hat{a}_2 - \hat{a}_1)}$ | Lower-bound and upper-bound of acceleration that vehicle should not exceed. In general case, $\hat{a}_1 = -\hat{a}_2 < 0$. | ciphertext |
| Angular acceleration limit | $\hat{m}$, | $\hat{m}, \dfrac{1}{\hat{m}}$, | Upper-bound on the product $s_k\theta_k$ (between speed $s_k$ and angular acceleration $\theta_k$ at time instant k) that vehicle should not exceed. | ciphertext |
| Driving time limit | $\hat{h}$ | $\dfrac{1}{\hat{h}}$ | Maximum total driving time per day that drivers should not exceed | ciphertext |
| Distance limit | $\hat{d}$ | $\dfrac{1}{\hat{d}}$ | Maximum distance that drivers are suggested to not drive continuously without stopping. | ciphertext |
| Combination coefficient | $w_1, w_2, w_3, w_4, w_5$ | $w_1, w_2, w_3, w_4, w_5$ | Combination coefficients of FoMs' scores. These are considered the weights of each FoM's score. | ciphertext |
| Exponent of scoring functions | $n_1, n_2, n_3, n_4, n_5$ | $n_1, n_2, n_3, n_4, n_5$ | Integer exponents used in FoM's scoring functions. | plaintext |

Upon receiving the set of policies from the insurance provider 204 and the telematic data from the monitoring device 206, the computing device 206 may perform analysis to obtain analysis results. In particular, the computing device 206 may calculate potential risk score based on data received from insurance provider 204 and monitoring device 202. The calculation of the risk score may be done on encrypted data where each party (for example, insurance provider 204 and monitoring device 202) share homomorphically encrypted data using different keys. A method for determining risk score is explained in greater detail in conjunction with FIG. 5.

To perform analysis, the computing device 206 may derive feature of measurement (FoM) derived from encrypted data (for example, derived from the encrypted telematic data and the set of predefined policies). Table 3 shows a list of derived FoM from encrypted data.

| FoM | Description | Formula |
|-----|-------------|---------|
| Acceleration | Velocity variation per unit of time | $a_k = \dfrac{s_k - s_{k-1}}{t_k - t_{k-1}}$ |
| Angular acceleration | Variation of steering wheel angle per a unit of time | $\theta_k = \dfrac{\omega_k - \omega_{k-1}}{t_k - t_{k-1}}$ |

8

-continued

| FoM | Description | Formula |
|-----|-------------|---------|
| Relative speed | Speed in relation to a location dependent limit | may be used directly without deriving algorithm |
| Driving time | Total driving time in the last 24 hours | |
| Distance | Distance travelled from the beginning of the trip to the present | $d_k = \Sigma_{i \leq k}\, s_{i-1} \cdot (t_i - t_{i-1})$ |

Upon obtaining the analysis results, the computing device 206 may further share the analysis result in an encrypted form (e.g., in a cyphertext format) to the monitoring device 202. The monitoring device 202 may then perform partially decryption on the analysis results shared by computing device 206 using a first decryption key and obtains partially decrypted results.

The monitoring device 202 may then share the partially decrypted analysis results with insurance provider 204 for final decryption. The insurance provider may then decrypt the partially decrypted results using a second decryption key and learn the analysis results in plain text format. It should be noted that during the whole process, the monitoring device 202 only knows its sensor values, and the computing device 206 only receives encrypted data, without having the corresponding cryptographic key of the vehicle. It may be impossible to decrypt and learn the monitoring device's sensor data. Similarly, the set of predefined policies provided by the insurance provider 204 are encrypted, and the computing device 206 only receives the encrypted form of these policies. In other words, the monitoring device 202 does not know the computed risk score while both computing device 206 and insurance provider 204 do not know the monitoring device's sensitive information.

Figure 3:
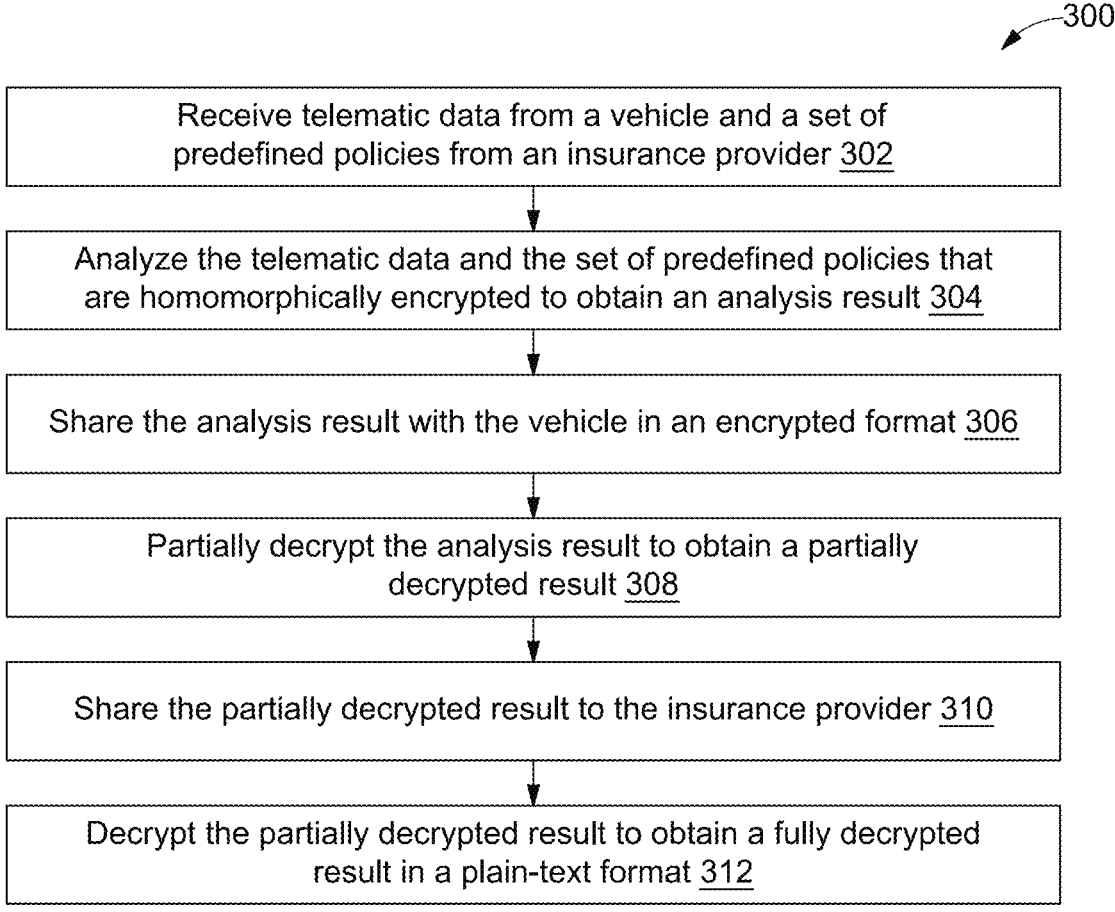
FIG. 3 is a flow diagram of a method for preserving privacy of telematic data, in accordance with some embodiments of the present disclosure.

Referring now to FIG. 3, a flow diagram of a method 300 for preserving privacy of telematic data is illustrated, in accordance with some embodiments of the present disclosure.

At step 302, a computing device may receive telematic data from a vehicle and a set of predefined policies from an insurance provider. It should be noted that the telematic data and the set of predefined policies may be received in a homomorphically encrypted form. The telematic data and the set of predefined policies may be homomorphically encrypted through a multi-key homomorphic encryption technique.

The telematic data received from the vehicle may include one or more of: a speed information of the vehicle, a steering angle information of the vehicle, a current time, a speed limit of the vehicle, and a current location of the vehicle. Additionally, the set of predefined policies received from the insurance provider may include an acceleration limit of the vehicle, an angular acceleration limit of the vehicle, a driving time limit of the vehicle, a distance limit of the vehicle, combination coefficients, and exponent values.

Once the computing device receives the telematic data and the set of predefined policies in the homomorphically encrypted form, the computing device, at step 304, may further analyze the telematic data and the set of predefined policies to obtain an analysis result. The analysis result may represent a risk score associated with a driving behavior of the vehicle. A method of analyzing the telematic data and the set of predefined policies and determining risk score are explained in greater detail conjunction with FIGS. 4 and 5.

Further, at step 306, the computing device may share the analysis result with the vehicle in an encrypted format. Further, at step 308, the vehicle may partially decrypt the analysis result through a first decryption key to obtain a partially decrypted result. It should be noted that the analysis result may be partially decrypted without revealing the risk score to a user of the vehicle.

At step 310, the vehicle may share the partially decrypted result to the insurance provider. The insurance provider, at step 312, may decrypt the partially decrypted result through a second decryption key to obtain a fully decrypted result in a plain-text format. The fully decrypted result may provide risk score information to the insurance provider without revealing sensitive information corresponding to the vehicle. Based on the risk score, the insurance provider may provide appropriate insurance premium to the respective user.

Referring now to FIG. 4, a flow diagram of a method 400 for analyzing telematic data and a set of predefined policies, in accordance with some embodiments of the present disclosure is illustrated. As mentioned earlier, at step 304, once the computing device receives the telematic data and the set of predefined policies from the monitoring device and the insurance provider, respectively, the computing device may further analyze the telematic data and the set of predefined policies to obtain the analysis result.

Therefore, in order to analyze the telematic data and the set of predefined policies, the computing device may determine a risk score of the vehicle based on the telematic data and the set of predefined policies, at step 402. The risk score may facilitate the insurance provider to determine appropriate premiums, policy terms, and coverage levels for respective user. This is further explained in conjunction with FIG. 5.

Referring now to FIG. 5, a flow diagram of a method 500 for determining a risk score of a vehicle is illustrated, in accordance with some embodiments of the present disclosure.

To determine the risk score, the computing device may utilize one or more scoring functions based on FoM derived from the telematic data and the set of predefined policies, at step 502. The FoM may include one or more of: acceleration of the vehicle, angular acceleration of the vehicle, relative speed of the vehicle, driving time of the vehicle, and distance of the vehicle.

The one or more scoring functions are based on one or more of: one-side thresholding functions and two-side thresholding functions. The one-side thresholding functions may assign a score based on whether a variable value is less than a threshold value. Moreover, the two-side thresholding functions may assign a score based on whether a variable value lies within a range of values.

In a more elaborative way, once the data from both the monitoring device and the insurance provider are received by the computing device, it performs an analysis to calculate a risk score for a given vehicle. This risk score is composed of multiple sub-scores which are combined to obtain a final risk score.

A scoring function assigns a scalar score, denoted as "S", within the range [0, 1] to a set of FoMs. The higher value of "S" signifies a safer driver than a lower value. To achieve this, firstly a safety level of driver is evaluated based on each FoM individually. These individual assessments are then combined to derive the final driver score.

Since homomorphic encryption does not support the comparison and division operations, therefore the present disclosure proposes two kinds of scoring functions f(x): one-side and two-side thresholding functions.

Figure 6A:
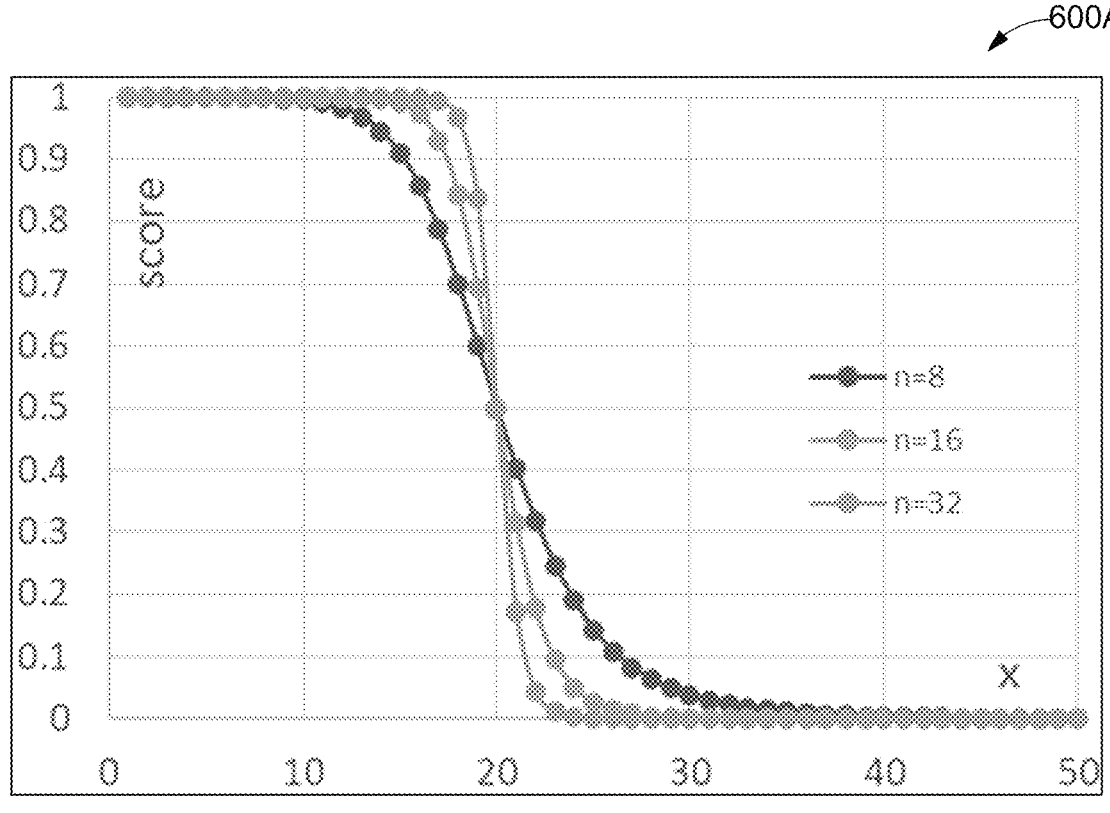
FIGS. 6A-6B illustrate exemplary one-side thresholding function and two-side thresholding function graphs, in accordance with some embodiments of the present disclosure.
Figure 6B:
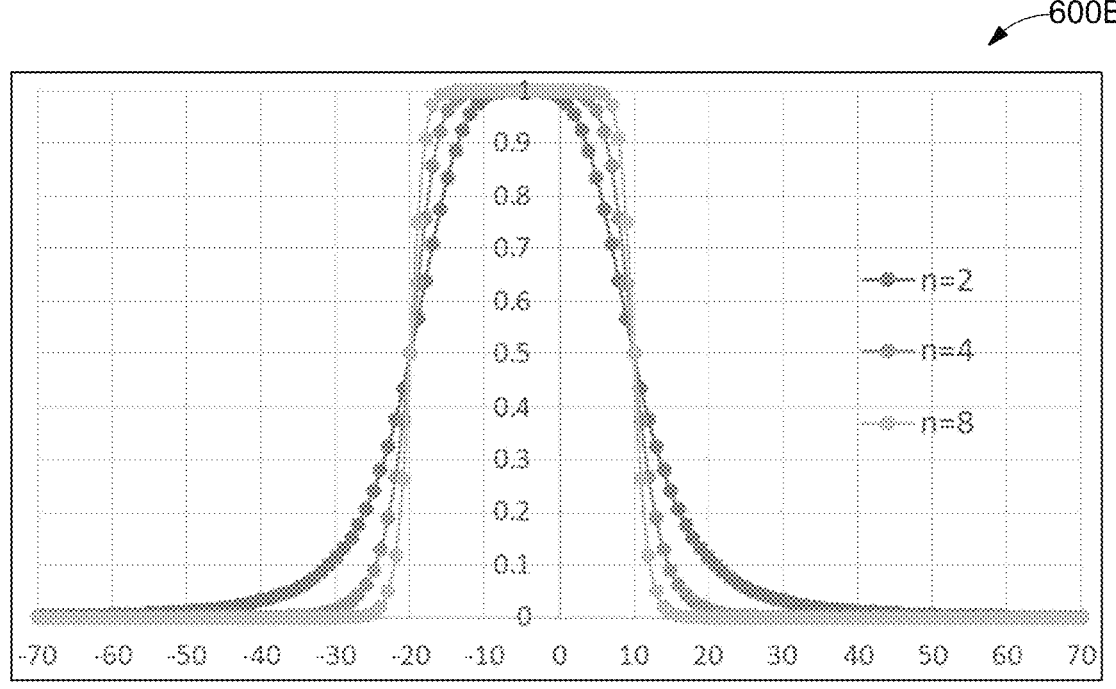

An exemplary one-side thresholding function with top threshold $x^*=20$ is depicted via a graph 600A of FIG. 6A. An exemplary two-side thresholding function with thresholds $x_1^*=-20$, $x_2^*=10$ is depicted via a graph 600B of FIG. 6B. These functions may determine whether a variable value x is smaller than a threshold $x^*$ or belongs to a range $[x_1^*, x_2^*]$, respectively.

The one-side thresholding function may be represented by equation (1):

$$f(x) = \frac{1}{1 + \left(\frac{x}{x^*}\right)^n} \tag{1}$$

Where: $0 \le f(x) = \text{Score} \le 1$; x is the current FoM for measuring the score, $x^*$ is the defined threshold shared by insurance provider, and "n" is a configuration parameter that may be set by the insurance provider. A higher value of "n" provides more precise results. The function assigns high scores to values below the threshold, low scores to values above it, and a score of 0.5 at the threshold. For example, score=0.5 at threshold $x^*$, score $\ge 0.5$ for $x \ge x^*$, score <0.5 for <$x^*$, and score=0 (<0e-30) for the small values that are far from the limit.

The two-side thresholding function may be represented by equation (2):

$$f(x) = \frac{1}{1 + 4^n \left(\frac{(x - x_1^*)(x - x_2^*)}{(x_2^* - x_1^*)^2} + \frac{1}{4}\right)^n} \tag{2}$$

Where: $0 \le \text{Score} \le 1$; and xx, xx are the minimum and maximum thresholds shared by the insurance provider. Similar to the one-side thresholding function, high scores are assigned to values within the specified range $[x_1^*, x_2^*]$, low scores to values outside the range $[x_1^*, x_2^*]$ and a score of 0.5 at the thresholds. By way of an example, score=1 for the values around the center $(x_1^*+x_2^*)/2$, score=0.5 at thresholds xx and $x_2^*$, score $\geq 0.5$ for $x \in [x_1^*, x_2^*]$, score <0.5 for $x \notin [x_1^*, x_2^*]$, and score ≈0 (<0e-30) for the values far from $[x_1^*, x_2^*]$.

As will be appreciated, the present disclosure designs soft thresholding functions (e.g., the one-side thresholding function and the two-side thresholding function) for scoring driving safety level on encrypted data. These soft thresholding functions offer several distinct advantages, including the elimination of the need for direct comparison operations. They establish a transition region that accommodates values falling between strictly valid and invalid, allowing for flexible scoring within this transition zone. Moreover, they effectively mitigate the potential for inaccurate assessments arising from data measurement noise, particularly in the vicinity of boundary values.

The guideline to design these soft threshold functions is to satisfy at least four criteria together given below:

$S(x) \in 0$, 1 for $\forall x \geq 0$ (in case of one-side thresholding function) and for $\forall x$ (in case of two-side thresholding function)

$S(x) \rightarrow 1$ for valid values (within threshold)

$S(x) \rightarrow 0$ for invalid values (outside threshold)

$S(x)=0.5$ for boundary values (around threshold)

As measurements move farther away from the defined thresholds, the assigned scores decrease, signifying increased risk. These functions have all the desired and necessary properties that a scoring function should have. The landmark to distinguish between a valid value (within range) and an invalid value (out of range) is a score of 0.5. Unlike hard thresholding functions that offer only two possible scores, 0 and 1, these functions smoothly transition around the threshold boundaries. The exponent 'n,' which is a positive integer, controls the steepness of the function graph: the larger 'n' is, the steeper the graph. This feature helps to minimize score inaccuracies caused by data measurement errors near the threshold boundaries.

Having this general formula enables the derivation of various feature-specific scoring functions. The subsequent embodiments of the present disclosure explains building of scoring functions for each FoM mentioned in Table 3.

Figure 7:
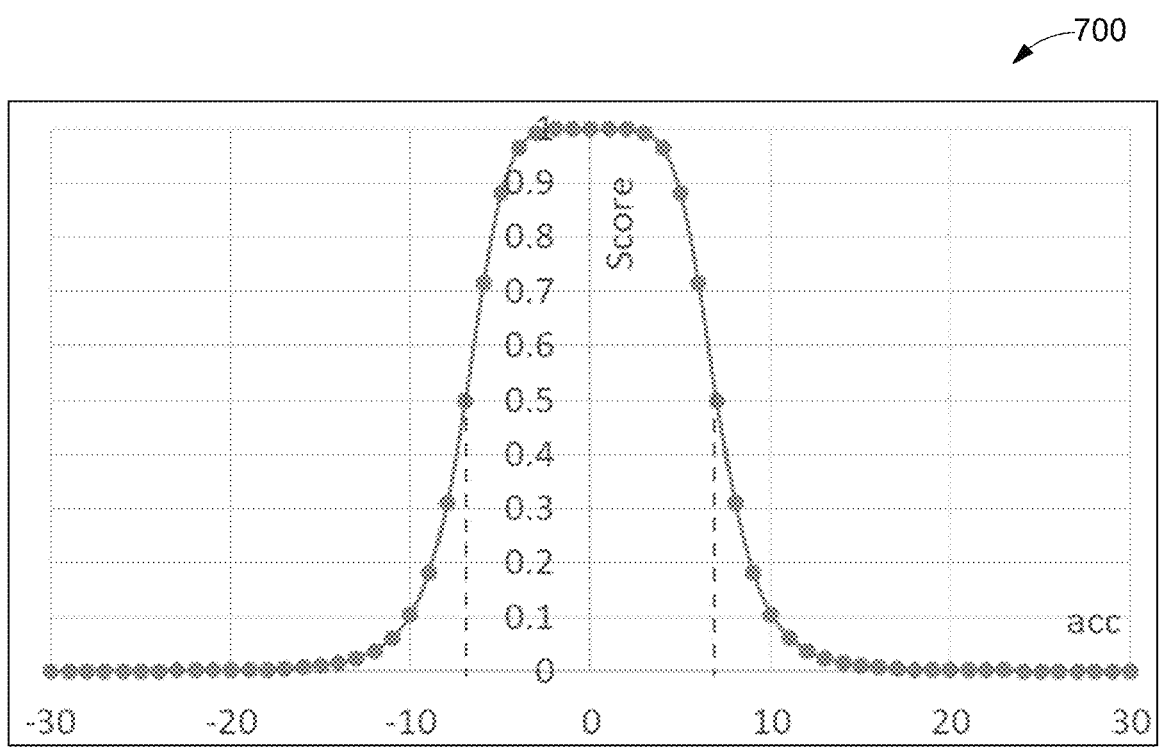
FIG. 7 illustrates a scoring function graph depicting scoring of driver based on acceleration, in accordance with some embodiments of the present disclosure.

FIG. 7 is a scoring function graph 700 depicting scoring of driver based on acceleration, in accordance with some embodiments of the present disclosure. The graph 700 is obtained by scoring the driver based on acceleration of the vehicle having exponent $n_1=3$, with thresholds $\hat{a}_1=-7$, $\hat{a}_2=7$ km/h/s.

To score drivers based on the acceleration, the two-side thresholding function may be utilized and represented by equation (3):

$$S_{acc} = \frac{1}{1 + 4^n \left( \dfrac{(\hat{a}_k - \hat{a}_1)(\hat{a}_k - \hat{a}_2)}{(\hat{a}_2 - \hat{a}_1)^2} + \dfrac{1}{4} \right)^n} \tag{3}$$

where: $n=n_1$ set by the insurance provider, and $\hat{a}_1$, $\hat{a}_2$ are two-side acceleration threshold, set by the insurance provider.

The FoM of acceleration reflects a driver's level of aggressiveness and observation. High positive values are associated with rapid acceleration events whereas high negative values are associated with harsh breaking events. These events are associated with the potential risk of traffic accidents. The insurance provider defines a different two-side acceleration threshold $(\hat{a}_1, \hat{a}_2)$ for scoring acceleration behavior. All values outside the range of $[\hat{a}_1, \hat{a}_2]$ are considered riskier driving behavior. Considering this indicator, the computing device may assess the driving safety level.

Apart from the scoring based on acceleration, the scoring to the driver may also be given based on steer angle acceleration. Angular acceleration (e.g., steering angle changes) should be small at high speeds. Conversely, both small and large angular accelerations are allowed when speed is low. This implies that the product $s_k \times |\theta_k|$ between speed $s_k$ and the absolute value of angular acceleration $|\theta_k|$ have to be small shown in below Table 4. As a result, a low safety rating may be assigned to drivers when this product is too high. The Table 4 shows a relationship between the safety score, speed, and angular acceleration.

| $s_k$ | $|\theta_k|$ | safety | score |
|-------|-------|--------|-------|
| high | high | not ok | low |
| high | low | ok | high |
| low | high | ok | high |
| low | low | ok | high |

Suppose $\hat{m}$ is the upper threshold of this product, $s_k \times |\theta_k| \leq \hat{m}$, which is a positive threshold and can be defined as $\hat{m} = \hat{s} \times \hat{\theta}$. In the other words $-\hat{m} \leq s_k \times \theta_k \leq \hat{m}$. To do this, two-side thresholding function may be applied for scoring the driver based on the steer angular acceleration, represented by equation (4). The insurer may establish either the upper bound of acceleration $\hat{\theta}$ or the upper bound m of this product. In the former case, we will set $\hat{m} = \hat{s} \times \hat{\theta}$.

$$S_{angle} = \frac{1}{1 + 4^n \left( \dfrac{(s_k \theta_k + \hat{m})(s_k \theta_k - \hat{m})}{(2\hat{m})^2} + \dfrac{1}{4} \right)^n} \tag{4}$$

Where: $n=n_2$ set by insurance provider, sk is vehicle speed, $\theta$k is angular acceleration, $\hat{s}$ is speed limit, $\hat{\theta}$ is angular acceleration limit, and $\hat{m}$ is upper threshold for $sk \times |\theta k|$ that may be set as $=\hat{s} \times \hat{\theta}$.

Figure 8A:
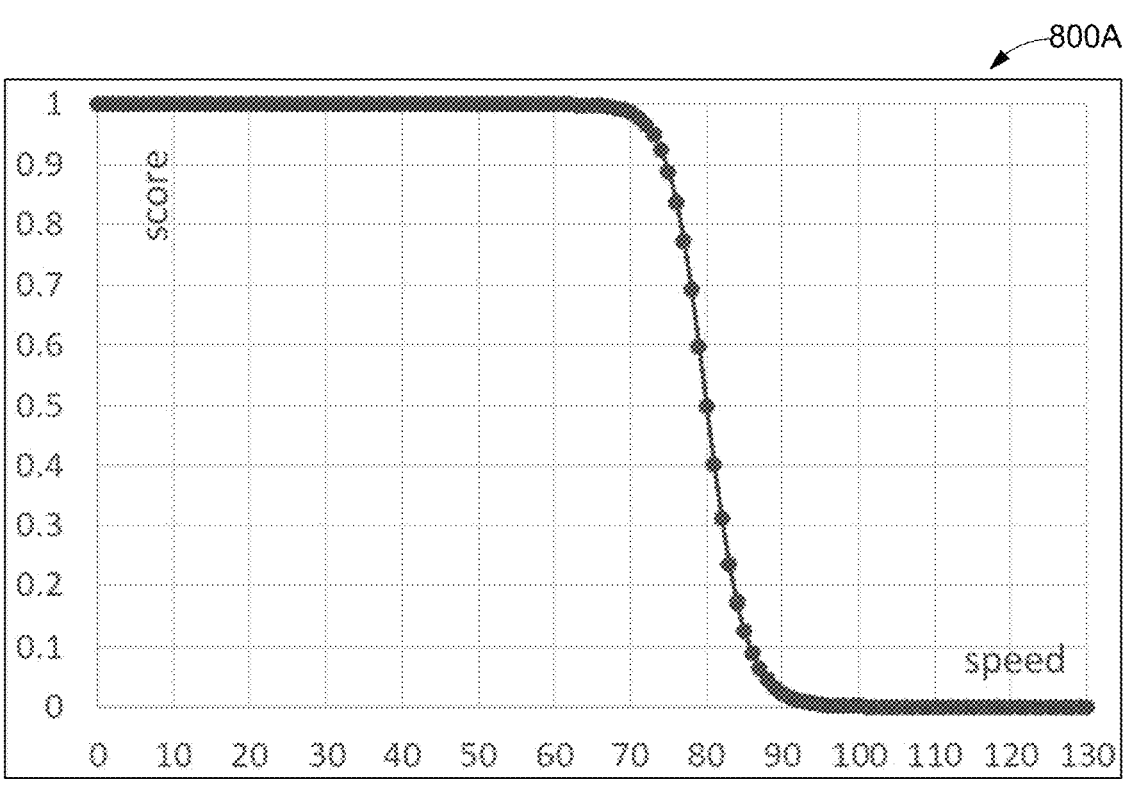
FIGS. 8A-8B illustrate scoring function graphs depicting scoring of a driver based on relative speed, in accordance with some embodiments of the present disclosure.
Figure 8B:
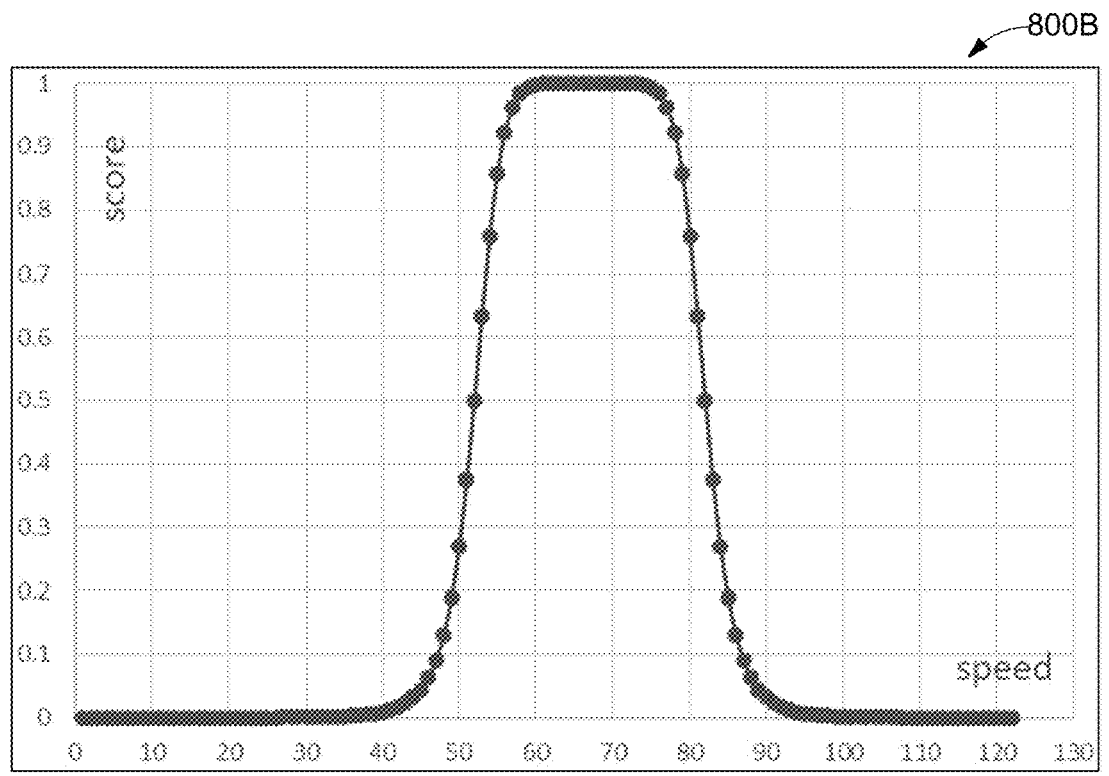

FIGS. 8A-8B illustrate scoring function graphs depicting scoring of a driver based on relative speed, in accordance with some embodiments of the present disclosure. One of the major causes of traffic accidents is excessive speeding. Depending on driving areas, different speed limitations may be applied. For instance, drivers are allowed higher speeds on highways compared to urban areas. The act of going beyond the maximum speed limit is statistically linked to a higher risk of traffic accidents, hence it should be given a low safety score. Therefore, for scoring of the driver at least two threshold-based scoring functions may be employed, each suited to different scenarios. One scenario involves a single top speed limit, while the other considers both lower and upper speed limits.

FIG. 8A is a scoring function graph 800A depicting scoring of driver based on speed relative to only upper limit. For this scenario, score may be determined by applying one-side threshold scoring function, represented by equation (5):

$$S_{speed} = \frac{1}{1 + \left( \dfrac{s_k}{\hat{s}} \right)^n} \tag{5}$$

Where: $n=n_3$ set by the insurance provider. In the present scoring function graph 800A, a value of n is set as "n=32" and speed relative to the upper limit is "ŝ=80 km/h".

FIG. 8B is a scoring function graph 800B depicting scoring of driver based on speed relative to upper limit and lower limit. For this scenario, score of the driver may be determined by applying two-side threshold scoring function, represented by equation (6):

$$S_{speed} = \frac{1}{1 + 4^n \left( \frac{(s_k - \hat{s}_1)(s_k - \hat{s}_2)}{(\hat{s}_2 - \hat{s}_1)^2} + \frac{1}{4} \right)^n} \quad (6)$$

Where: $n=n_3$ set by the insurance provider. In the present scoring function graph 800B, a value of n is set as "n=4" and speed relative to the lower limit is "ŝ$_1$=52 km/h" and upper limit is "ŝ$_2$=82 km/h".

Figure 9:
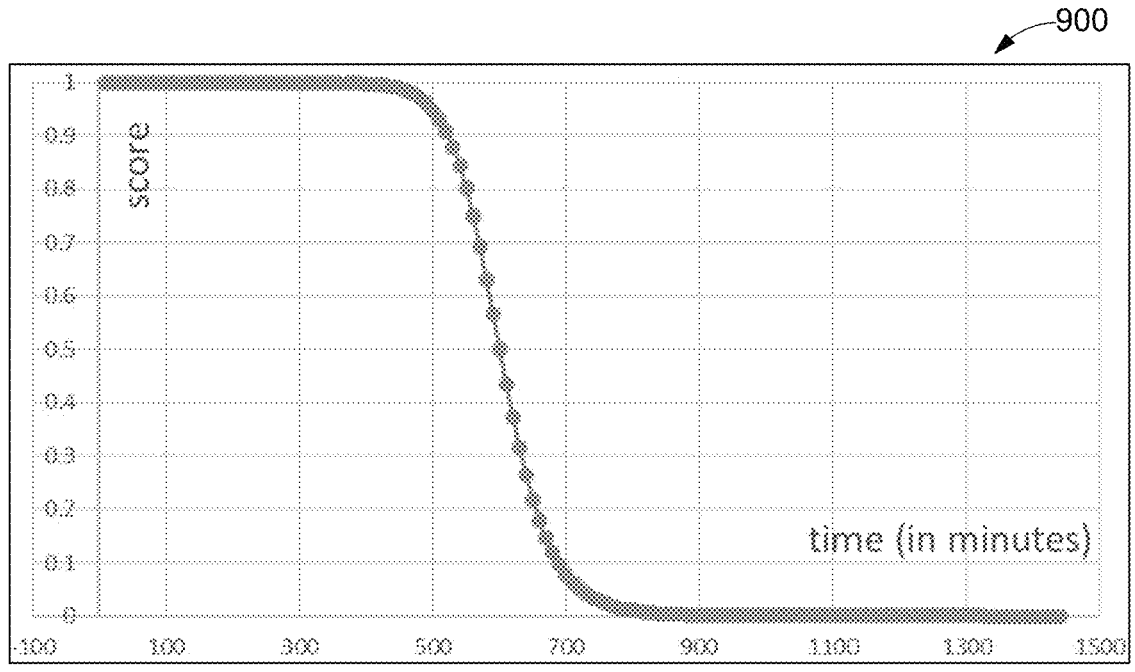
FIG. 9 illustrates a scoring function graph depicting scoring of the driver based on driving time, in accordance with some embodiments of the present disclosure.

FIG. 9 is a scoring function graph 900 depicting scoring of the driver based on driving time. Several studies have provided evidence that drivers should not be on the road for more than 10 hours in a single day. Drivers who travel too much a day may become fatigued, exhausted, lose focus, or fall asleep, all of which significantly increase the likelihood of accidents. Therefore, the daily driving duration serves as an important metric for assessing safety. It should be noted that the maximum allowable driving time may vary between insurance companies, as each may set their own limits.

The score of the driver may be determined by employing one-side threshold scoring function, represented by equation (7):

$$S_{time} = \frac{1}{1 + \left( \frac{h_k}{\hat{h}} \right)^n} \quad (7)$$

Where: $n=n_4$ set by the insurance provider. In the present scoring function graph 900, the value of n is set as "n=16" and driving time per day limit is set to be 10 hours (e.g., 600 minutes).

Figure 10:
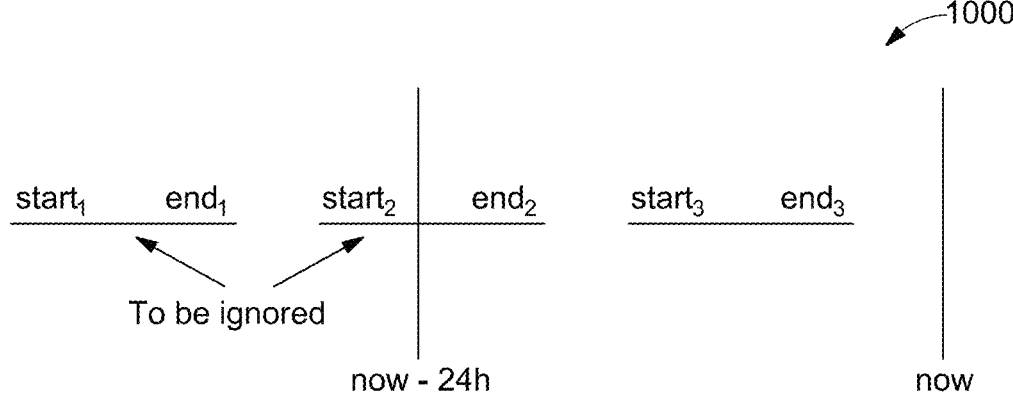
FIG. 10 illustrates an outline of a process for updating a trip queue, in accordance with some embodiments of the present disclosure.

Therefore, to maintain a record of trip start and end times within the past 24-hour period, a queue system may be used. FIG. 10 presents an outline of the process 1000 which entails the regular update of this trip queue. Once a new trip is made or the current trip continues, this queue may be updated. The trips or portions of trips that are older than 24 hours may be ignored.

Figure 11:
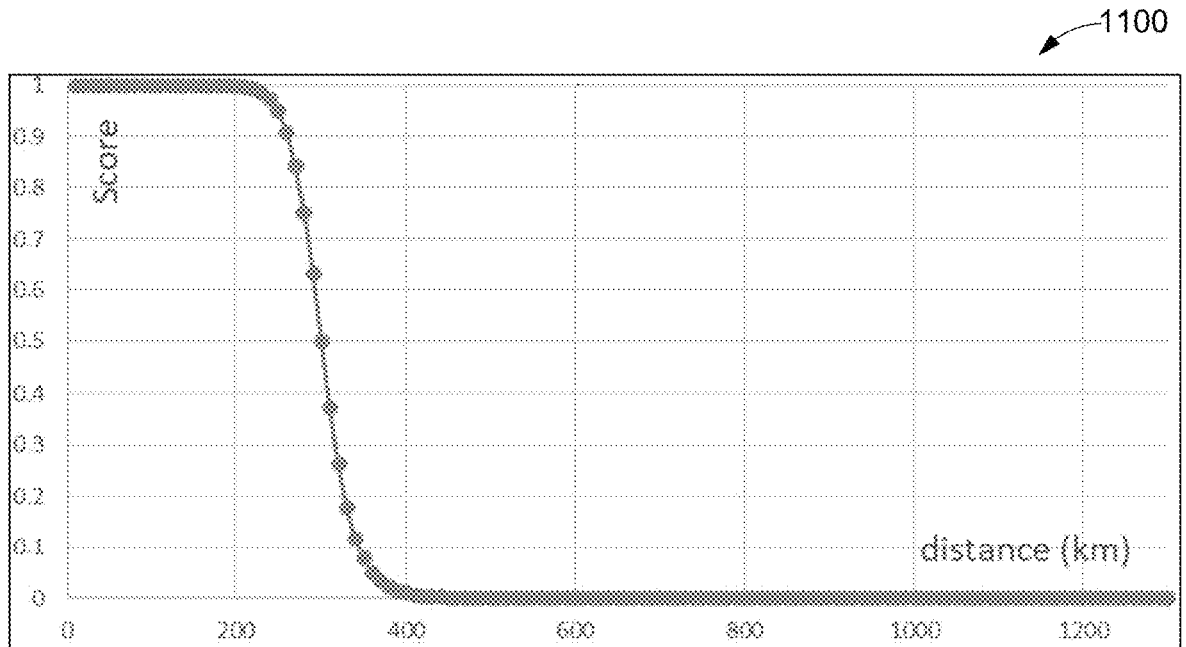
FIG. 11 illustrates a scoring function graph depicting scoring of the driver based on trip distance, in accordance with some embodiments of the present disclosure.

FIG. 11 is a scoring function graph 1100 depicting scoring of the driver based on trip distance, in accordance with some embodiments of the present disclosure. Similar to driving time, long trips, and extended periods of continuous driving may cause driver fatigue, which is more likely to be a factor in crashes. Driving trips longer than a certain threshold set by the insurance provider may be harshly penalized, i.e., given a low safety rate.

The one-side thresholding function may be employed to score driver safety, represented by equation (8):

$$S_{distance} = \frac{1}{1 + \left( \frac{d_k}{\hat{d}} \right)^n} \quad (8)$$

Where $n=n_5$ set by the insurance provider. In the present scoring function graph 1100, the value of n is set as "n=16" and trip distance limit is set to be 300 km.

To calculate the trip distance, all segments that the driver traveled from the beginning of the trip may be accumulated as follows:

$$d_1 = 0$$

$$d_2 = d_1 + s_1 * (t_2 - t_1)$$

$$\cdots$$

$$dk = dk - 1 + sk - 1 * (tk - tk - 1)$$

Where $d_k$ denotes the total distance up to time instant k.

Upon obtaining scores from each FoM, a final score may be given to the driver by combining each of the FoM scores. More specifically, the final score given to the driver at each instant "k" is the sum of all scores assessed from different FoMs, as represented by equation (9).

$$\text{Score} = w_1 \cdot S_{acc} + w_2 \cdot S_{speed} + w_3 \cdot S_{ang} + w_4 \cdot S_{time} + w_5 \cdot S_{distance} \quad (9)$$

Where $w_i$ are the combination coefficients (weights) of FoMs, defined by the insurance provider based on the importance of FoMs for the risk assessment, and the sum of $w_i$ is equal to 1. One may argue that among the FoMs, over-speeding should have the highest value because it is the most serious cause of accidents. The total driving time which results in drivers' fatigue and focus loss, is the second most critical issue. Since the impact of long-distance trips is already considered in the impact of the total driving time per day, its weight, $w_5$, may be the least. Hence, as an example, the values of weights may be set as $w_1=0.2$, $w_2=0.3$, $w_3=0.15$, $w_4=0.25$, $w_5=0.1$.

Since homomorphic encryption only supports addition and multiplication, an equivalent transformation may be performed for the score formula to avoid division. It is noticed that the formula of $S_{acc}$, $S_{speed}$, $S_{ang}$, $S_{time}$, $S_{distance}$, are the fractions with a numerator equal to 1. For simplicity, the denominator of these fractions may be denoted as $\text{pen}_{acc}$, $\text{pen}_{speed}$, $\text{pen}_{ang}$, $\text{pen}_{time}$, $\text{pen}_{distance}$, or more succinctly as $p_1$, $p_2$, $p_3$, $p_4$, and $p_5$, respectively.

$$p1 = \text{pen}_{acc} = 1 + 4^n \left( \frac{(\hat{a}_k - \hat{a}_1)(\hat{a}_k - \hat{a}_2)}{(\hat{a}_2 - \hat{a}_1)^2} + \frac{1}{4} \right)^n =$$

$$1 + 4^n \left( (\hat{a}_k - \hat{a}_1)(\hat{a}_k - \hat{a}_2) \cdot \left( \frac{1}{(\hat{a}_2 - \hat{a}_1)} \right)^2 + \frac{1}{4} \right)^n$$

$$p2 = \text{pen}_{ang} = 1 + 4^n \left( \frac{(s_k \theta_k + \hat{m})(s_k \theta_k - \hat{m})}{(2\hat{m})^2} + \frac{1}{4} \right)^n =$$

$$1 + 4^n \left( (s_k \theta_k + \hat{m})(s_k \theta_k - \hat{m}) \left( \frac{1}{(2\hat{m})^2} \right)^2 + \frac{1}{4} \right)^n$$

$$p_3 = \text{pen}_{speed} = 1 + \left( \frac{s_k}{\hat{s}} \right)^n = 1 + (s_k)^n \left( \frac{1}{\hat{s}} \right)^n$$

$$p_4 = \text{pen}_{time} = 1 + \left( \frac{h_k}{\hat{h}} \right)^n = 1 + (h_k)^n \left( \frac{1}{\hat{h}} \right)^n$$

$$p_5 = \text{pen}_{distance} = 1 + \left( \frac{d_k}{\hat{d}} \right)^n = 1 + (d_k)^n \left( \frac{1}{\hat{d}} \right)^n$$

Besides FoMs' threshold values, the insurance provider also sends to the computing device their inverse values of $$\frac{1}{\hat{a}_2 - \hat{a}_1}, \frac{1}{\hat{\theta}_2 - \hat{\theta}_1}, \frac{1}{\hat{s}}, \frac{1}{\hat{h}}, \frac{1}{\hat{d}},$$

Since all $pen_i$ only include additions, subtractions, and multiplications, they are calculable on the ciphertext. Now, equation (9) is rewritten as follows:

$$\text{Score} = w_1 \frac{1}{p_1} + w_2 \frac{1}{p_2} + w_3 \frac{1}{p_3} + w_4 \frac{1}{p_4} + w_5 \frac{1}{p_5} = \frac{\sum_i \left( w_i \prod_{j \neq i} p_j \right)}{\prod_i p_i}$$

$$= \frac{w_1 p_2 p_3 p_4 p_5 + w_2 p_1 p_3 p_4 p_5 + w_3 p_1 p_2 p_4 p_5 + w_4 p_1 p_2 p_3 p_5 + w_5 p_1 p_2 p_3 p_4}{p_1 p_2 p_3 p_4 p_5} \quad (10)$$

$$= \frac{\varepsilon(w_1 p_2 p_3 p_4 p_5 + w_2 p_1 p_3 p_4 p_5 + w_3 p_1 p_2 p_4 p_5 + w_4 p_1 p_2 p_3 p_5 + w_5 p_1 p_2 p_3 p_4)}{\varepsilon p_1 p_2 p_3 p_4 p_5} = \frac{A}{B} \quad (11)$$

Where "$\varepsilon$" is a randomly generated float number that does not change the ratio when multiplied by both the numerator and denominator of equation (10). Since the numerator and denominator of equation (11), denoted as "A" and "B", are just composed solely of addition and multiplication, they are computable. The computing device may return to vehicle two ciphertext values, "A" and "B", for partial decryption. The insurance provider may fully decrypt "A" and "B", and conducts the division "A/B" to obtain the final safety score for drivers at time instant "k". The purpose for using the random number "$\varepsilon$" is to prevent drivers or hackers from learning the scoring result.

Once the final risk score is obtained, the insurance provider may utilize this risk score to offer personalized insurance plans to vehicle owners, taking into account their specific driving habits and risk factors. The higher the risk score, the greater the likelihood of accidents or policy violations, which may result in adjustments to insurance premiums or coverage terms. Conversely, lower risk scores may lead to more favourable insurance offerings. Importantly, this risk assessment may be performed without exposing the sensitive details of the vehicle's telematic data or compromising the user's privacy. It enables a fair and data-driven approach to insurance policy customization while safeguarding the confidentiality of the driver's information.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 12:
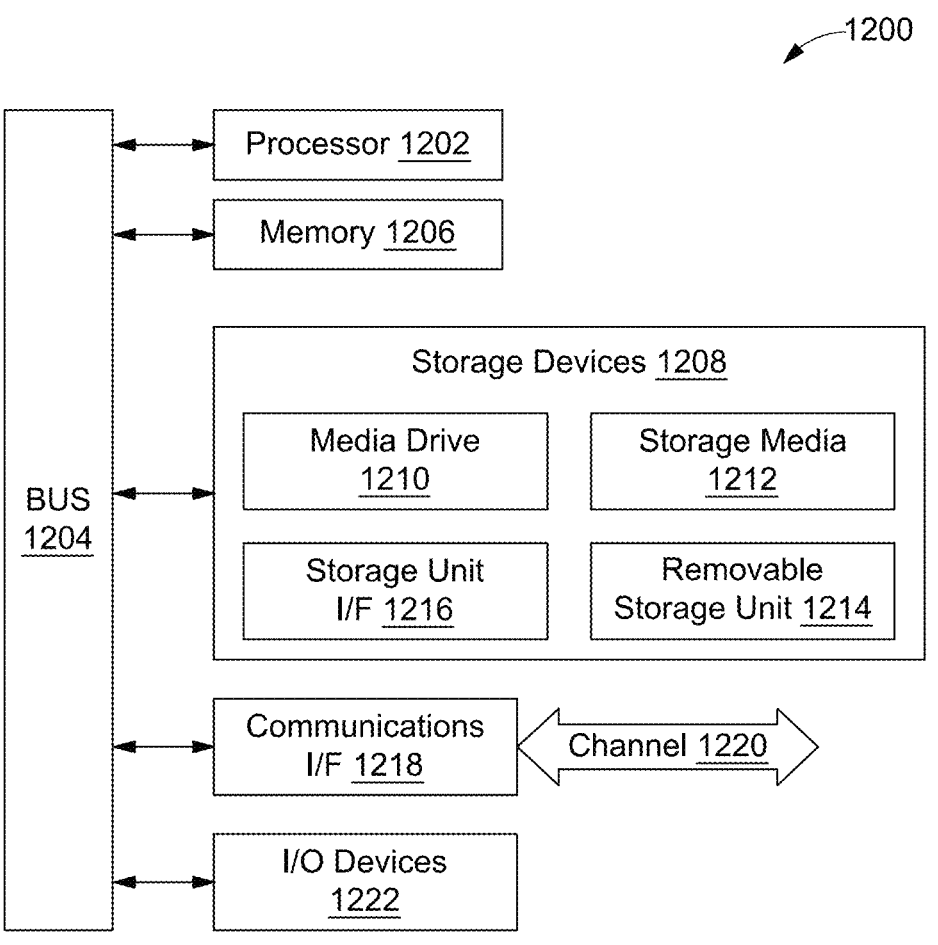
FIG. 12 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 12, an exemplary computing system 1200 that may be employed to implement processing functionality for various embodiments (e.g., as a, client device, server device, one or more processors, or the like) is illustrated. Those skilled in the relevant art will also recognize how to implement the invention using other computer systems or architectures. The computing system 1200 may represent, for example, a user device such as a desktop, a laptop, a mobile phone, personal entertainment device, and so on, or any other type of special or general-purpose computing device as may be desirable or appropriate for a given application or environment. The computing system 1200 may include one or more processors, such as a processor 1202 that may be implemented using a general or special purpose processing engine such as, for example, a microprocessor, microcontroller, or other control logic. In this example, the processor 1202 is connected to a bus 1204 or other communication medium. In some embodiments, the processor 1202 may be an Artificial Intelligence (AI) processor, which may be implemented as a Tensor Processing Unit (TPU), or a graphical processor unit, or a custom programmable solution Field-Programmable Gate Array (FPGA).

The computing system 1200 may also include a memory 1206 (main memory), for example, Random Access Memory (RAM) or other dynamic memory, for storing information and instructions to be executed by the processor 1202. The memory 1206 also may be used for storing temporary variables or other intermediate information during execution of instructions to be executed by the processor 1202. The computing system 1200 may likewise include a read only memory ("ROM") or other static storage device coupled to bus 504 for storing static information and instructions for the processor 1202.

The computing system 1200 may also include a storage device 1208, which may include, for example, a media drives 1210 and a removable storage interface. The media drive 1210 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 1212 may include, for example, a hard disk, magnetic tape, flash drive, or other fixed or removable medium that is read by and written to by the media drive 1210. As these examples illustrate, the storage media 1212 may include a computer-readable storage medium having stored there in particular computer software or data.

In alternative embodiments, the storage devices 1208 may include other similar instrumentalities for allowing computer programs or other instructions or data to be loaded into the computing system 500. Such instrumentalities may include, for example, a removable storage unit 1214 and a storage unit interface 1216, such as a program cartridge and cartridge interface, a removable memory (for example, a flash memory or other removable memory module) and memory slot, and other removable storage units and interfaces that allow software and data to be transferred from the removable storage unit 1214 to the computing system 500.

The computing system 1200 may also include a communications interface 1218. The communications interface 1218 may be used to allow software and data to be transferred between the computing system 1200 and external devices. Examples of the communications interface 1218 may include a network interface (such as an Ethernet or other NIC card), a communications port (such as for example, a USB port, a micro-USB port), Near field Communication (NFC), etc. Software and data transferred via the communications interface 1218 are in the form of signals which may be electronic, electromagnetic, optical, or other signals capable of being received by the communications interface 1218. These signals are provided to the communications interface 1218 via a channel 1220. The channel 1220 may carry signals and may be implemented using a wireless medium, wire or cable, fiber optics, or other communications medium. Some examples of the channel 1220 may include a phone line, a cellular phone link, an RF link, a Bluetooth link, a network interface, a local or wide area network, and other communications channels.

The computing system 1200 may further include Input/Output (I/O) devices 1222. Examples may include, but are not limited to a display, keypad, microphone, audio speakers, vibrating motor, LED lights, etc. The I/O devices 1222 may receive input from a user and also display an output of the computation performed by the processor 1202. In this document, the terms "computer program product" and "computer-readable medium" may be used generally to refer to media such as, for example, the memory 1206, the storage devices 1208, the removable storage unit 1214, or signal(s) on the channel 1220. These and other forms of computer-readable media may be involved in providing one or more sequences of one or more instructions to the processor 1202 for execution. Such instructions, generally referred to as "computer program code" (which may be grouped in the form of computer programs or other groupings), when executed, enable the computing system 1200 to perform features or functions of embodiments of the present invention.

In an embodiment where the elements are implemented using software, the software may be stored in a computer-readable medium and loaded into the computing system 1200 using, for example, the removable storage unit 1214, the media drive 1210 or the communications interface 1218. The control logic (in this example, software instructions or computer program code), when executed by the processor 1202, causes the processor 1202 to perform the functions of the invention as described herein.

Thus, the disclosed method and system try to overcome the technical challenge of preserving the privacy of vehicle telematic data without exposing sensitive information to any of the parties involved. This objective is achieved by employing multi-key homomorphic encryption techniques throughout the process. With these encryption methods, calculations and analysis may be performed on the data while it remains in its encrypted form, ensuring that no plaintext information is ever exposed during the process. Therefore, to achieve this, the disclosed system and method may first allow the monitoring device to periodically share the current (homomorphically encrypted) telematic data to the insurance provider. The insurance provider may then forward the telematic data to computing device for calculating the corresponding risk score based on the policies shared by the insurance provider previously. Both data coming from insurance provider and from monitoring device may be encrypted using multi-key homomorphic encryption techniques. This means, both sides encrypt their data (set of policies and telematic data) using their distinct encryption keys. The computing device, upon receiving data from insurance provider and from monitoring device, performs analysis to provide the results (in homomorphically encrypted form) to the monitoring device. The analysis is guided by the set of predefined policies shared by the insurance provider. The monitoring device may then perform partially decryption on the results shared by the computing device and obtains partially decrypted results. It then shares the results with the insurance provider for final decryption. The insurance provider then finally decrypt the results and learn the analysis results in plain text.

As will be appreciated by those skilled in the art, the techniques described in the various embodiments discussed above are not routine, or conventional or well understood in the art. One of the primary applications of disclosed techniques is in the domain of usage-based insurance. The algorithm developed for calculating risk scores is accurately designed to be compatible with homomorphic encryption. This becomes the foundational element for privacy preserving of usage-based insurance that relies on vehicle telematic data. The insurance providers may assess the level of risk associated with a driver's behavior without the need to access the driver's sensitive data, thereby preserving privacy.

The versatility of this approach extends beyond insurance. It may be effectively applied in various use cases, including patient health monitoring. In such scenarios, monitoring devices collect and transmit health data, which is then homomorphically encrypted before being sent to a central unit. The central unit may evaluate risk scores based on this encrypted data without exposing any specific health-related information to any party, including the computing device.

One of the key benefits of the disclosed techniques is the privacy it offers to monitoring devices. These devices, which may include sensors collecting data such as location and movement, maintain their privacy. The computing device only receives encrypted data and lacks access to the cryptographic key necessary for decrypting the monitoring device's sensor values. Additionally, the set of predefined policies provided by the insurance provider are transmitted in encrypted form, preventing the monitoring device from gaining access to the computed risk score. Importantly, both the computing device and insurance provider are kept in the dark regarding the monitoring device's sensitive information.

Another notable feature of the disclosed techniques is the heightened security and privacy achieved through multi-key homomorphic encryption. The joint or distributed decryption process, involving both the monitoring device and the insurance provider, enhances the overall security of the proposed system. This collaborative decryption approach ensures that no single entity may independently access sensitive information, adding an extra layer of protection.

Moreover, the disclosed techniques demonstrate resistance against data theft. As it exclusively operates with encrypted data, including sensor values and insurance policies, it significantly mitigates the risk of data breaches. Even if data were to be stolen from the computing device, the strong encryption measures in place make it practically impossible for hackers to decipher sensitive information such as the vehicle's location or other confidential details.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described system and method for preserving privacy of telematic data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for preserving privacy of telematic data, the method comprising:

receiving, by a computing device, telematic data from a vehicle and a set of predefined policies from an insurance provider, wherein the telematic data and the set of predefined policies are homomorphically encrypted through a multi-key homomorphic encryption technique;

analyzing, by the computing device, the telematic data and the set of predefined policies that are homomorphically encrypted to obtain an analysis result, wherein the analysis result represents a risk score associated with a driving behavior of the vehicle;

sharing, by the computing device, the analysis result with the vehicle in an encrypted format;

partially decrypting, by the vehicle and through a first decryption key, the analysis result to obtain a partially decrypted result, wherein the analysis result is partially decrypted without revealing the risk score to a user of the vehicle;

sharing, by the vehicle, the partially decrypted result to the insurance provider; and decrypting, by the insurance provider and through a second decryption key, the partially decrypted result to obtain a fully decrypted result in a plain-text format, wherein the fully decrypted result provides risk score information to the insurance provider without revealing sensitive information corresponding to the vehicle.

2. The method of claim 1, wherein the telematic data comprises one or more of: a speed information of the vehicle, a steering angle information of the vehicle, a current time, a speed limit of the vehicle, and a current location of the vehicle.

3. The method of claim 1, wherein the set of predefined policies comprises an acceleration limit of the vehicle, an angular acceleration limit of the vehicle, a driving time limit of the vehicle, a distance limit of the vehicle, combination coefficients, and exponent values.

4. The method of claim 1, wherein analyzing comprises:

determining the risk score of the vehicle based on the telematic data and the set of predefined policies, wherein the risk score facilitates the insurance provider to determine appropriate premiums, policy terms, and coverage levels for respective user.

5. The method of claim 4, wherein determining the risk score comprises:

utilizing one or more scoring functions based on feature of measurement (FoM) derived from the telematic data and the set of predefined policies.

6. The method of claim 5, wherein the FoM comprises one or more of: acceleration of the vehicle, angular acceleration of the vehicle, relative speed of the vehicle, driving time of the vehicle, and distance of the vehicle.

7. The method of claim 5, wherein the one or more scoring functions are based on one or more of: one-side thresholding functions and two-side thresholding functions.

8. The method of claim 7, wherein the one-side thresholding functions assign a score based on whether a variable value is less than a threshold value, and wherein the two-side thresholding functions assign a score based on whether a variable value lies within a range of values.

9. A system for preserving privacy of telematic data, the system comprising:

a vehicle;

an insurance provider; and a computing device connected to the vehicle and the insurance provider via a communication network, wherein the computing device comprises:

a first processor; and a first memory communicatively coupled to the first processor, wherein the first memory stores processor instructions, which when executed by the first processor, cause the first processor to:

receive telematic data from the vehicle and a set of predefined policies from an insurance provider, wherein the telematic data and the set of predefined policies are homomorphically encrypted through a multi-key homomorphic encryption technique;

analyze the telematic data and the set of predefined policies that are homomorphically encrypted to obtain an analysis result, wherein the analysis result represents a risk score associated with a driving behavior of the vehicle; and share the analysis result with the vehicle in an encrypted format;

wherein the vehicle is configured to:

partially decrypt, through a first decryption key, the analysis result to obtain a partially decrypted result, wherein the analysis result is partially decrypted without revealing the risk score to a user of the vehicle; and share the partially decrypted result to the insurance provider; and wherein the insurance provider comprises:

a second processor; and a second memory communicatively coupled to the second processor, wherein the second memory stores processor instructions, which when executed by the second processor, cause the second processor to:

decrypt, through a second decryption key, the partially decrypted result to obtain a fully decrypted result in a plain-text format, wherein the fully decrypted result provides risk score information to the insurance provider without revealing sensitive information corresponding to the vehicle.

10. The system of claim 9, wherein the telematic data comprises one or more of: a speed information of the vehicle, a steering angle information of the vehicle, a current time, a speed limit of the vehicle, and a current location of the vehicle.

11. The system of claim 9, wherein the set of predefined policies comprises an acceleration limit of the vehicle, an angular acceleration limit of the vehicle, a driving time limit of the vehicle, a distance limit of the vehicle, combination coefficients, and exponent values.

12. The system of claim 9, wherein to analyze the telematic data and the set of predefined policies, the processor instructions, when executed by the first processor, further cause the first processor to:

determine the risk score of the vehicle based on the telematic data and the set of predefined policies, wherein the risk score facilitates the insurance provider to determine appropriate premiums, policy terms, and coverage levels for respective user.

13. The system of claim 12, wherein to determine the risk score, the processor instructions, when executed by the first processor, further cause the first processor to:

utilize one or more scoring functions based on feature of measurement (FoM) derived from the telematic data and the set of predefined policies.

14. The system of claim 13, wherein the FoM comprises one or more of: acceleration of the vehicle, angular acceleration of the vehicle, relative speed of the vehicle, driving time of the vehicle, and distance of the vehicle.

15. The system of claim 13, wherein the one or more scoring functions are based on one or more of: one-side thresholding functions and two-side thresholding functions.

16. The system of claim 15, wherein the one-side thresholding functions assign a score based on whether a variable value is less than a threshold value, and wherein the two-side thresholding functions assign a score based on whether a variable value lies within a range of values.

17. A computer program product for preserving privacy of telematic data, the computer program product being embodied in a non-transitory computer readable storage medium of a computing device and comprising computer instructions for:

receiving telematic data from a vehicle and a set of predefined policies from an insurance provider, wherein the telematic data and the set of predefined policies are homomorphically encrypted through a multi-key homomorphic encryption technique;

analyzing the telematic data and the set of predefined policies that are homomorphically encrypted to obtain an analysis result, wherein the analysis result represents a risk score associated with a driving behavior of the vehicle;

sharing the analysis result with the vehicle in an encrypted format;

partially decrypting the analysis result to obtain a partially decrypted result, wherein the analysis result is partially decrypted without revealing the risk score to a user of the vehicle;

sharing the partially decrypted result to the insurance provider; and decrypting the partially decrypted result to obtain a fully decrypted result in a plain-text format, wherein the fully decrypted result provides risk score information to the insurance provider without revealing sensitive information corresponding to the vehicle.

18. The computer program product of claim 17, wherein to analyze the telematic data and the set of predefined policies, the computer instructions further configured for:

determining the risk score of the vehicle based on the telematic data and the set of predefined policies, wherein the risk score facilitates the insurance provider to determine appropriate premiums, policy terms, and coverage levels for respective user.

19. The computer program product of claim 18, wherein to determine the risk score, the computer instructions further configured for:

utilizing one or more scoring functions based on feature of measurement (FoM) derived from the telematic data and the set of predefined policies.

20. The computer program product of claim 19, wherein the FoM comprises one or more of: acceleration of the vehicle, angular acceleration of the vehicle, relative speed of the vehicle, driving time of the vehicle, and distance of the vehicle.

* * * * *